United States Patent
Kaku et al.

(10) Patent No.: US 12,246,622 B2
(45) Date of Patent: Mar. 11, 2025

(54) SEAT SYSTEM THAT CHANGES THE THRESHOULD OF THE PRESSURE LOAD BASED ON THE PRESSURE LOAD TO THE SENSOR WITH OUTPUT BY TOUCH OPERATION OF SENSORS

(71) Applicant: TS TECH CO., LTD., Asaka (JP)

(72) Inventors: Hiroyuki Kaku, Tochigi (JP); Akira Miyoshi, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 18/501,110

(22) Filed: Nov. 3, 2023

(65) Prior Publication Data

US 2024/0059191 A1    Feb. 22, 2024

Related U.S. Application Data

(63) Continuation of application No. 17/785,272, filed as application No. PCT/JP2020/044841 on Dec. 2, 2020, now Pat. No. 11,845,362.

(Continued)

(51) Int. Cl.
*G08B 21/00* (2006.01)
*B60N 2/00* (2006.01)
(Continued)

(52) U.S. Cl.
CPC .......... *B60Q 3/233* (2017.02); *B60N 2/0022* (2023.08); *B60N 2/0033* (2023.08);
(Continued)

(58) Field of Classification Search
CPC ........ B60N 2/002; B60N 2/90; B60N 2/0022; B60N 2/0033; B60N 2/0239;
(Continued)

(56) References Cited

U.S. PATENT DOCUMENTS

| 10,464,476 B1 | 11/2019 | Mazuir et al. |
| 11,685,531 B1 * | 6/2023 | Mower ................. B60N 2/002 244/129.1 |

(Continued)

FOREIGN PATENT DOCUMENTS

| JP | H03-13993 | 1/1991 |
| JP | 2013-147161 | 8/2013 |

(Continued)

OTHER PUBLICATIONS

PCT International Search Report (w/ English translation) for corresponding PCT Application No. PCT/JP2020/044841, mailed on Jan. 26, 2021, 8 pages.

*Primary Examiner* — Mark S Rushing
(74) *Attorney, Agent, or Firm* — Dority & Manning, P.A.

(57) ABSTRACT

Provided is a seat system which can change a surrounding environment of a user including illumination according to the movement of the user's body. A seat system comprises a seat body on which a user can be seated; a plurality of sensors provided on or in the seat body or on a structure arranged around the seat body and configured to detect a touch operation by the user seated on the seat body; an output device configured to output at least one of sound, light, and vibration; and a control device configured to control the output device such that, when one or more of the sensors detect a touch operation, the control device causes the output device to generate a corresponding predetermined output.

8 Claims, 9 Drawing Sheets

Related U.S. Application Data

(60) Provisional application No. 62/951,647, filed on Dec. 20, 2019.

(51) Int. Cl.
*B60N 2/02* (2006.01)
*B60N 2/90* (2018.01)
*B60Q 3/233* (2017.01)
*B60Q 9/00* (2006.01)

(52) U.S. Cl.
CPC ............ *B60N 2/0228* (2013.01); *B60N 2/90* (2018.02); *B60Q 9/00* (2013.01); *B60N 2/0239* (2023.08)

(58) Field of Classification Search
CPC ........ B60N 2/0228; B60Q 3/233; B60Q 9/00; B60Q 3/74; B60Q 3/80

USPC ...................................................... 340/573.1
See application file for complete search history.

(56) References Cited

U.S. PATENT DOCUMENTS

| | | |
|---|---|---|
| 2005/0052426 A1 | 3/2005 | Hagermoser et al. |
| 2005/0216158 A1* | 9/2005 | Sakai ................ B60R 21/01516 |
| | | 701/45 |
| 2019/0135199 A1 | 5/2019 | Galan Garcia et al. |

FOREIGN PATENT DOCUMENTS

| | | |
|---|---|---|
| JP | 2018-142841 | 9/2018 |
| JP | 2019-125958 | 7/2019 |
| JP | 2020-175808 | 10/2020 |
| WO | WO2017/038486 | 3/2017 |
| WO | WO2018/012589 | 1/2018 |

* cited by examiner

| ID | sensor | instrument | note |
|---|---|---|---|
| 100−a | 100a | guitar | C |
| 101−a | 101a | piano | C |
| 101−b | 101b | piano | D |
| 101−c | 101c | piano | E |
| 101−d | 101d | piano | F |
| 102−a | 102a | violin | C |
| 102−b | 102b | violin | D |
| 102−c | 102c | violin | E |
| 102−d | 102d | violin | F |

| user | fav music genre | music title | tempo | instrument |
|------|-----------------|-------------|-------|------------|
| A | classic music | Canon | middle | violin |
| B | pop music | Love pop | fast | guitar |
| C | rock music | Rock dance | fast | trumpet |
| D | traditional song | Shinano river song | slow | piano |

SEAT SYSTEM THAT CHANGES THE THRESHOULD OF THE PRESSURE LOAD BASED ON THE PRESSURE LOAD TO THE SENSOR WITH OUTPUT BY TOUCH OPERATION OF SENSORS

CROSS REFERENCE TO RELATED APPLICATIONS

This application is a continuation of U.S. patent application Ser. No. 17/785,272, filed on Jun. 14, 2022, which is the U.S. National Stage entry of International Application No. PCT/JP2020/044841, filed on Dec. 2, 2020, which, in turn, claims priority to U.S. Provisional Patent Application No. 62/951,647 filed on Dec. 20, 2019, all of which are incorporated herein by reference.

TECHNICAL FIELD

The present invention relates to a seat system including a seat on which a user can be seated.

BACKGROUND ART

An autonomous vehicle, which is capable of autonomous driving, does not require a driver to perform a driving operation during autonomous driving, which gives the driver more time to freely move. Thus, various seats capable of providing a more comfortable environment for drivers, and their control systems for controlling a surrounding environment (hereinafter referred to as seat systems) have been developed.

There has been a need for vehicle seats which offer added values, such as functions to keep a user seated on the seat from getting bored or to avoid user's health problems caused due to a lack of physical activity in the vehicle. To meet such a need, a seat system with an added value; that is, a function to encourage a driver to move the driver's body has been developed (See Patent Document 1).

The seat system disclosed in Patent Document 1 includes: a seat body on which a user can be seated; a sensor configured to detect movement of the user; and an application terminal on which game applications are executable. When a game application starts to run, the application terminal displays a sign and a mascot figure to encourage a user to move the body to the change or movement of the sign or mascot figure. When the user moves the user's body, the sensor detects the movement of the user's body and the application terminal displays the degree of synchronization between the change or movement of the sign or mascot figure and the movement of the user's body.

PRIOR ART DOCUMENT(S)

Patent Document(s)

Patent Document 1: JP2020-175808A

SUMMARY OF THE INVENTION

Task to be Accomplished by the Invention

In the case of the seat system disclosed in Patent Document 1, a user can know the degree of synchronization between the user's movement and the change or movement of the sign or mascot figure only by what is displayed on the application terminal. Thus, a user needs to look carefully at the application terminal while the game application is running, which makes it difficult for the user to freely move the user's body.

One possible way to increase a seat system's ability for entertaining a user is to provide a seat system configured to change a surrounding environment of a user (such as illumination) according to the movement of the user's body, thereby notifying the user of the degree of synchronization in a more impressive manner. However, the seat system disclosed in Patent Document 1 has a problem that ways of providing notifications to a user are limited since the seat system can provide notifications to a user only through the display of the application terminal.

The present invention has been made in view of the problem of the prior art, and a primary object of the present invention is to provide a seat system which can change a surrounding environment of a user including illumination according to the movement of the user's body.

Means to Accomplish the Task

An aspect of the present invention provides a seat system (1, 300, A, B), comprising: a seat body (5) on which a user can be seated; a plurality of sensors provided on or in the seat body (5) or a structure arranged around the seat body (5), each being configured to detect a touch operation by the user seated on the seat body; an output device configured to output at least one of sound, light, and vibration; and a control device (70) configured to control the output device such that, when one or more of the sensors detect a touch operation, the control device causes the output device to generate a corresponding predetermined output.

In this configuration, since the output device outputs at least one of sound, light, and vibration according to the movement of the user's body, the seat system can effectively change a surrounding environment of the user.

The above seat system may be further configured such that the output device includes a speaker (202), and wherein the predetermined output is a sound with a predetermined pitch.

In this configuration, since the seat system can output a sound with different pitches according to the user's touch operation, the seat system can effectively encourage the user to move the body.

The above seat system may be further configured such that the plurality of sensors are divided into two or more sensor groups, each sensor group being provided on or in a corresponding one of at least two component members of the seat system (1, 300, A, B), and wherein different instrument sounds are assigned to the respective sensor groups.

In this configuration, since the seat system can output different musical instrument sounds according to the user's touch operation on the different sensor groups, the user can easily feel as if the user is playing the various instruments by performing touch operations.

The above seat system may be further configured such that the seat body (5) comprises a seat cushion (12) on which the user is seated and a seat back (11) connected to the seat cushion (12) and located behind the user's back, and wherein at least one of the plurality of sensors is provided on any one of an upper surface of the seat cushion (12), a front surface of the seat back (11), a back side surface of a seat back of a front seat body, an armrest, an ottoman, a headrest (12), a floor (3) defining a floor surface of a passenger compartment (2), a steering wheel (42), a door (15, 16), an instrument panel (20), a pillar (60), and a built-in table (43).

This configuration can increase the number of sensors on which the user's touch operation can be performed, thereby allowing for more free use of the seat system.

The above seat system may be further configured such that the seat system (1, 300, A, B) is mounted in a vehicle (M), wherein the vehicle (M) includes an environment information acquisition device (79) communicably connected to the control device (70), and wherein the control device (70) is configured to: acquire at least one information record of an environment surrounding the vehicle (M) from the environment information acquisition device (79); and change the output of the output device based on the acquired information record.

In this configuration, the seat system can acquire an information record on an environment surrounding the vehicle from the sensors, thereby improving safety of the vehicle and decreasing a physical burden on the user while the seat system is used, which results in that the user can use the seat system more comfortably.

The above seat system may be further configured such that the seat system (1, 300, A, B) further comprises: a biosensor communicably connected to the control device (70) and configured to authenticate the user; and an input/output terminal (76) communicably connected to the control device (70) and configured to receive input by the user, wherein the control device (70) is capable of storing user information about the user, and wherein the control device (70) first identifies a user who uses the seat system (1, 300, A, B) based on user's input to the input/output terminal (76) or user's biometric information from the biosensor, in combination with the user information pre-stored in the control device (70), and then causes the speaker (202) to output a sound based on the user's input to the input/output terminal or the user information about the identified user pre-stored in the control device (70).

This configuration enables the user to choose music that suits the user's taste, enabling the user to use the seat system more comfortably.

The above seat system may be further configured such that the seat system (1, 300,) further comprises: an input/output terminal communicably connected to the control device and configured to receive input by the user, and wherein the seat system can be communicably linked to another seat system such that the control devices of both of the seat systems can share the outputs of the respective output devices.

This configuration enables the user to enjoy playing a game using the seat system together with another user who is using a different seat system.

The above seat system may be further configured such that each part of the seat body or the structure where a corresponding sensor is provided is made locally rigid.

This configuration enables an input load to be effectively transferred to a sensor, thereby ensuring that the sensor detects a user's touch operation.

Effect of the Invention

An aspect of the present invention made to achieve the above-described object is a seat system, comprising: a seat body on which a user can be seated; a plurality of sensors provided on or in the seat body or a structure arranged around the seat body, each being configured to detect a touch operation by the user seated on the seat body; an output device configured to output at least one of sound, light, and vibration; and a control device configured to control the output device such that, when one or more of the sensors detect a touch operation, the control device causes the output device to generate a corresponding predetermined output. In this configuration, since the output device outputs at least one of sound, light, and vibration according to the movement of the user's body, the seat system can effectively change a surrounding environment of the user.

The above seat system may be further configured such that the output device includes a speaker, and wherein the predetermined output is a sound with a predetermined pitch. In this configuration, since the seat system can output a sound with different pitches according to the user's touch operation, the seat system can effectively encourage the user to move the body.

The above seat system may be further configured such that the plurality of sensors are divided into two or more sensor groups, each sensor group being provided on or in a corresponding one of at least two component members of the seat system, and wherein different instrument sounds are assigned to the respective sensor groups. In this configuration, since the seat system can output different musical instrument sounds according to the user's touch operation on the different sensor groups, the user can easily feel as if the user is playing the various instruments by performing touch operations.

The above seat system may be further configured such that the seat body comprises a seat cushion on which the user is seated and a seat back connected to the seat cushion and located behind the user's back, and wherein at least one of the plurality of sensors is provided on any one of an upper surface of the seat cushion, a front surface of the seat back, a back side surface of a seat back of a front seat body, an armrest, an ottoman, a headrest, a floor defining a floor surface of a passenger compartment, a steering wheel, a door, an instrument panel, a pillar, and a built-in table. This configuration can increase the number of sensors on which the user's touch operation can be performed, thereby allowing for more free use of the seat system.

The above seat system may be further configured such that the seat system is mounted in a vehicle, wherein the vehicle includes an environment information acquisition device communicably connected to the control device, and wherein the control device is configured to: acquire at least one information record of an environment surrounding the vehicle from the environment information acquisition device; and change the output of the output device based on the acquired information record. In this configuration, the seat system can acquire an information record on an environment surrounding the vehicle from the sensors, thereby improving safety of the vehicle and decreasing a physical burden on the user while the seat system is used, which results in that the user can use the seat system more comfortably.

The above seat system may be further configured such that the seat system further comprises: a biosensor communicably connected to the control device and configured to authenticate the user; and an input/output terminal communicably connected to the control device and configured to receive input by the user, wherein the control device is capable of storing user information about the user, and wherein the control device first identifies a user who uses the seat system based on user's input to the input/output terminal or user's biometric information from the biosensor, in combination with the user information pre-stored in the control device, and then causes the speaker to output a sound based on the user's input to the input/output terminal or the user information about the identified user pre-stored in the control device. This configuration enables the user to choose music that suits the user's taste, enabling the user to use the seat system more comfortably.

The above seat system may be further configured such that The above seat system may be further configured such that the seat system further comprises: an input/output terminal communicably connected to the control device and configured to receive input by the user, and wherein the seat system can be communicably linked to another seat system such that the control devices of both of the seat systems can share the outputs of the respective output devices. This configuration enables the user to enjoy playing a game using the seat system together with another user who is using a different seat system.

The above seat system may be further configured such that each part of the seat body or the structure where a corresponding sensor is provided is made locally rigid. This configuration enables an input load to be effectively transferred to a sensor, thereby ensuring that the sensor detects a user's touch operation.

BRIEF DESCRIPTION OF THE DRAWINGS

FIG. 5 shows a table showing musical instruments and notes of a musical scale assigned to the respective sensors;

DESCRIPTION OF THE PREFERRED EMBODIMENT(S)

Embodiments of a seat system 1 of the present invention will be described in the following with reference to the appended drawings.

First Embodiment

Figure 1:
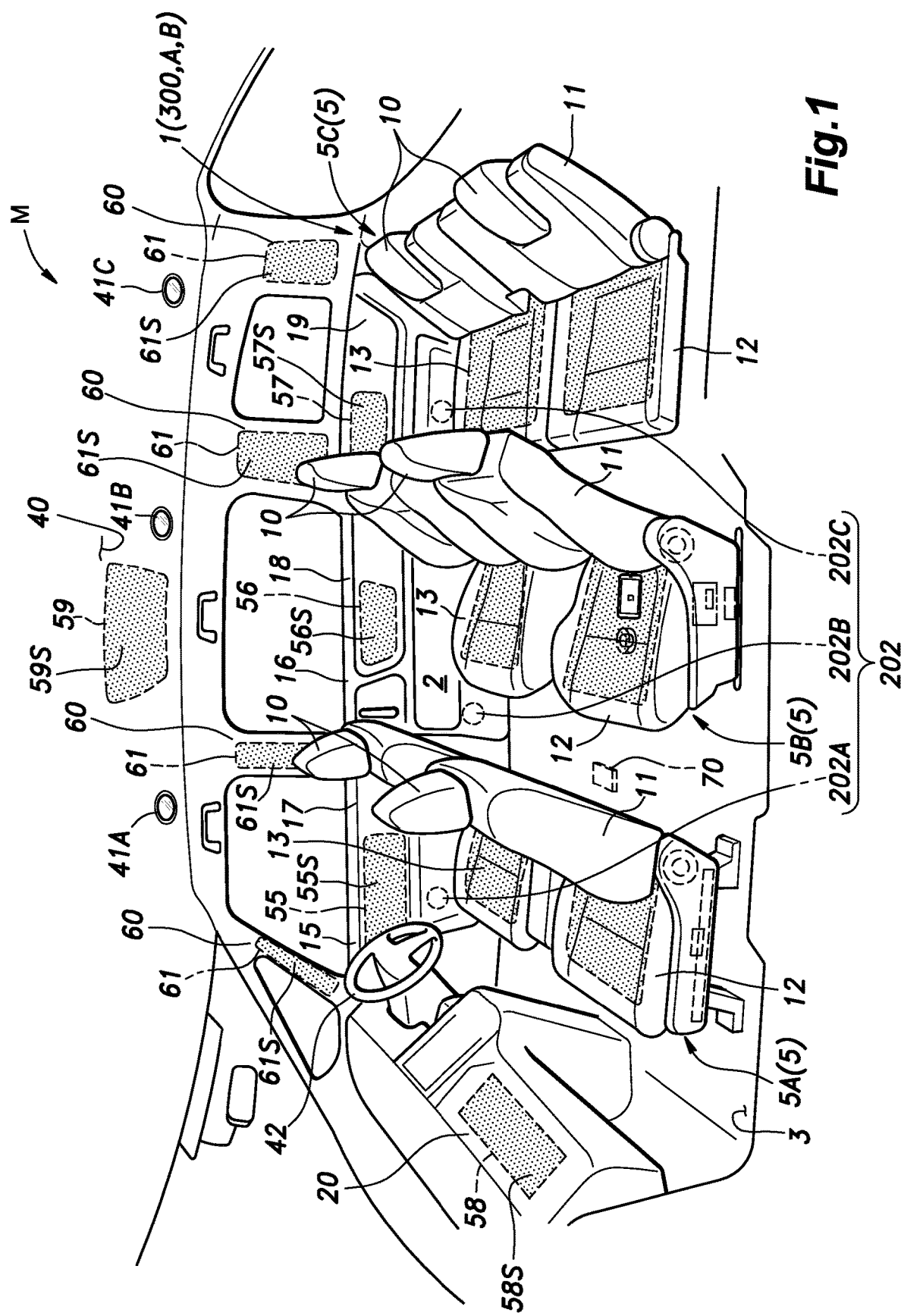
FIG. 1 is a perspective view of a passenger compartment of a vehicle equipped with a seat system of an embodiment of the present invention.

As shown in FIG. 1, a seat system 1 is provided in a vehicle M such as an automobile. The vehicle M of the present embodiment includes a pair of left and right front seat bodies 5A that form a first row, a pair of left and right mid-seat bodies 5B that form a second row, and a rear seat body 5C that forms a third row. The left and right mid-seat bodies 5B are arranged behind the corresponding front seat bodies 5A, respectively, and the left and right front seat bodies 5A and the left and right mid-seat bodies 5B are arranged in alignment with each other in a front-rear direction, respectively. In the present embodiment, the rear seat body 5C is a bench seat which extends in the left-right direction behind the left and right mid-seat bodies 5B to form a seating area for two persons.

Each seat body 5 includes a seat cushion 12 provided on the floor 3 of a passenger compartment 2, a seat back 11 coupled to a rear part of the seat cushion 12, and a headrest 10 provided on the top of the seat back 11. The seat cushion 12 is a seating portion for supporting the buttocks and thighs of a seated user from below, and the upper surface thereof forms a seating surface 13. The seat back 11 is a backrest portion for supporting the back portion of the seated user from behind.

As shown in FIG. 1, the vehicle M is provided with front doors 15 on the respective exterior sides of the front seat bodies 5A and rear doors 16 on the respective exterior sides of the mid-seat bodies 5B. Door trims 17 and 18 are coupled to the interior side surfaces of the front and rear doors 15 and 16, respectively. On the exterior sides of the rear seat body 5C, rear side trims 19 are provided on the interior wall surfaces which define the passenger compartment 2. An instrument panel 20 is provided on the surface in front of the front seat bodies 5A. The instrument panel 20 is located in front of the two front seat bodies 5A, one forming the driver's seat and the other forming a passenger seat.

The seat system 1 is applied to any one or a plurality of seats provided in the vehicle M. An example will be described in detail in which the seat system 1 is applied to the left front seat body 5A, i.e., the front passenger seat (hereinafter referred to simply as "the seat body 5A"; see FIG. 2). In the following description, the front/rear, up/down, and right/left directions are defined relative to a user seated on the seat body 5A.

As shown in FIG. 1, the seat system 1 includes a seat body 5A, a plurality of sensors, an output device, and a control device 70.

The sensors are provided on or in component members; that is, the seat body 5 and structural members around the seat body 5. Each sensor has a touch area corresponding to the surface region of a component member on or in which the sensor is provided. Each sensor detects a user's touch operation performed on the touch area, or a predetermined level or more of load applied to the touch area as an input load. A sensor may be a capacitance type sensor that detects a user's touch operation as a change in capacitance, a membrane switch, or any other type of touch sensor. In the present embodiment, each sensor detects a predetermined level or more of input load (i.e., a pressing force) applied to the corresponding touch area.

Figure 2:
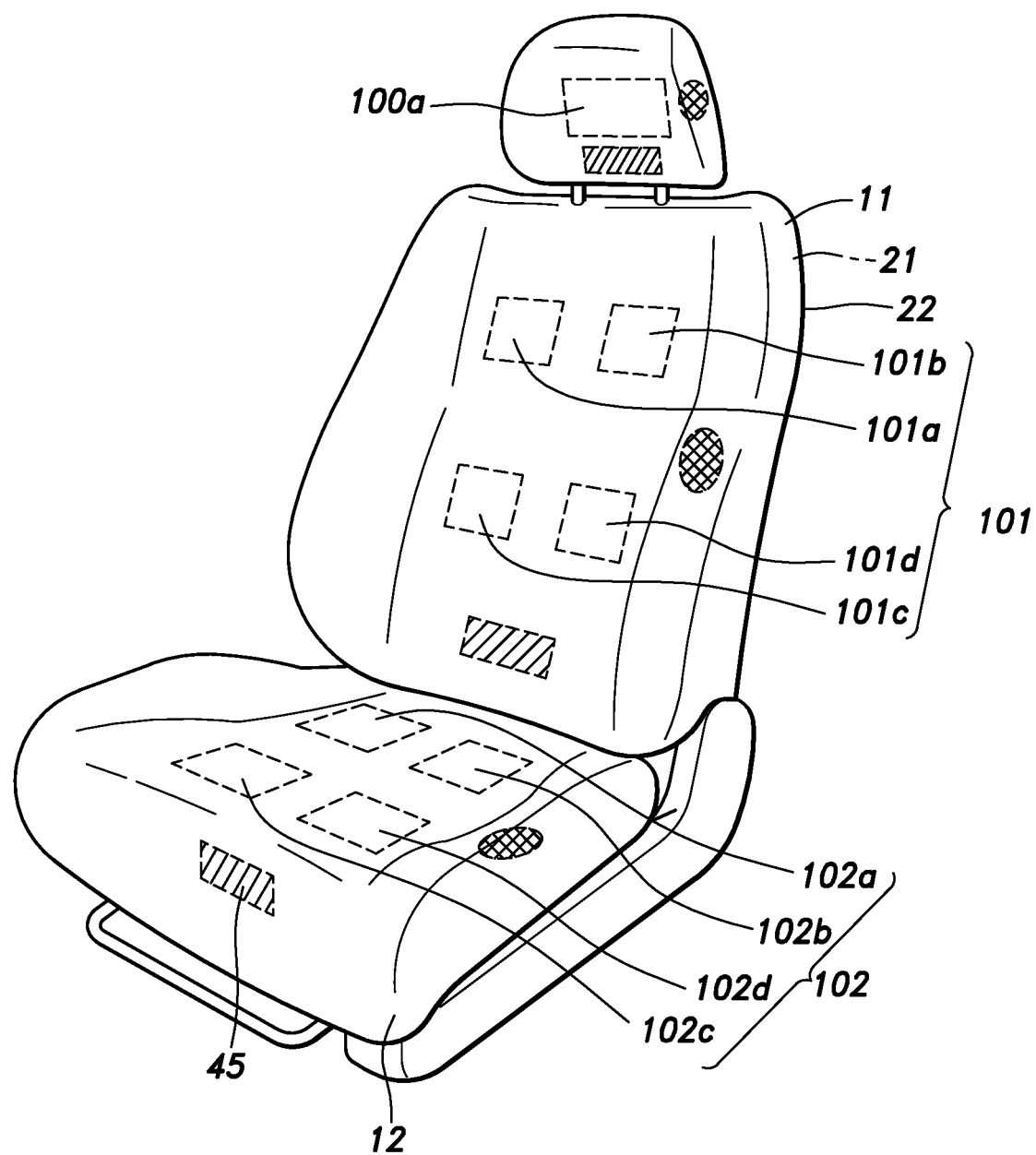
FIG. 2 is a perspective view of a seat body.

As shown in FIG. 2, the sensors are provided on the headrest 10, the seat back 11, and the seat cushion 12 of the seat body 5. Sensors provided on the headrest 10 are arranged between a pad member 21 forming the headrest 10, and a skin material 22 covering the pad member 21 of the headrest 10. Sensors provided on the seat back 11 are arranged between a pad member 21 forming the seat back 11, and a skin material 22 covering the pad member 21 of the seat back 11. Sensors provided on the seat cushion 12 are also arranged between a pad member 21 forming the seat cushion 12, and a skin material 22 covering the pad member 21 of the seat cushion 12.

Each pad member 21 is made of a flexible plastic material such as urethane foam. Each skin material 22 is made of, for example, woven fabric, leather, or synthetic leather.

Figure 3:
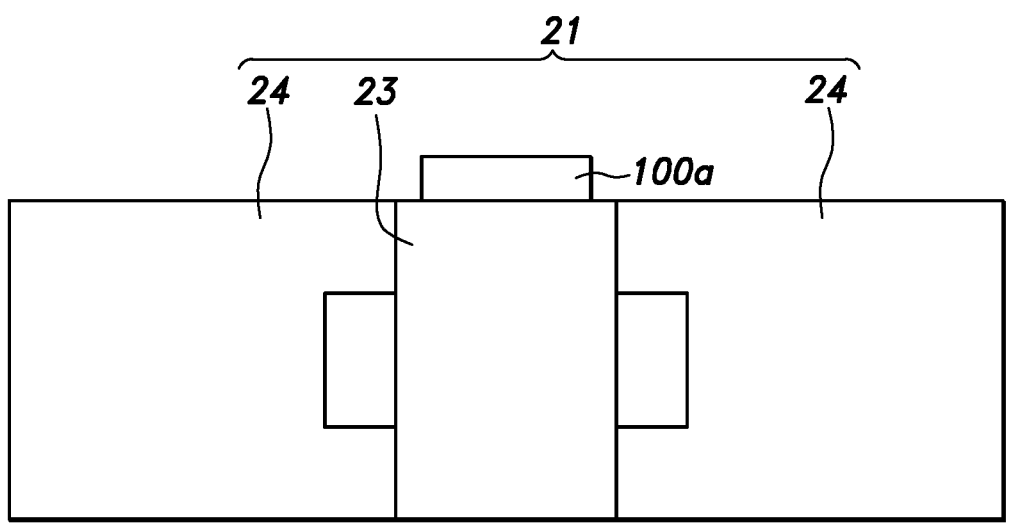
FIG. 3 is a cross-sectional view of an area of the seat body where a sensor is provided.

As shown in FIG. 3, a pad member 21 includes a part which is less deformed than the remaining part, at a location under the backside of a sensor. In other words, each part of the seat body 5 where a sensor is provided is made locally rigid.

In the present embodiment, as shown in FIG. 3, a pad member 21 includes a first pad member 23 under the back side of each sensor and a second pad member 24 surrounding the first pad member 23. The elastic modulus of a material of the first pad member 23 is greater than that of a material of the second pad member 24, which means that the first pad member 23 is less deformed by the load applied thereto than the second pad member 24. Therefore, when a pressing force is applied to the seat body 5 in the downward direction, a sensor provided on the first pad member 23 is less likely to move downward than a case where the sensor is provided on the material of the second pad member 24. Thus, an input load can be effectively transferred to the sensor, thereby ensuring that the sensor detects a user's touch operation.

The sensors on the seat back 11 are arranged so as to form a group along an upper portion of the front surface of the seat back 11. More specifically, the sensors on the seat back 11 are arranged on the upper portion of the front surface of the seat back 11 to form upper and lower pairs of left and right sensors such that the upper and lower left sensors and the upper and lower right sensors are arranged in vertical alignment with each other, respectively. Hereinafter, the set of sensors on the seat back 11 are referred to as a back sensor group 101.

In the present embodiment, the back sensor group 101 includes two pairs of left and right sensors such that the pairs are arranged one above the other. Hereinafter, as shown in FIG. 2, the sensors located in the upper right, upper left, lower right, and lower left portions are referred to as a sensor 101*a*, a sensor 101*b*, a sensor 101*c*, and a 101*d*, respectively. The respective touch areas of the upper right, upper left, lower right, and lower left sensors 101*a*, 101*b*, 101*c*, and 101*d* are located in the upper right, upper left, lower right, and lower left portions of the front surface of the seat back 11, respectively.

The sensors on the seat cushion 12 are arranged so as to form a group along the upper surface of the seat cushion 12. More specifically, the sensors arranged on the upper surface of the seat cushion 12 form front and rear pairs of sensors of left and right sensors such that the left sensors and the right sensors are arranged in alignment with each other in the front-rear direction, respectively. Hereinafter, the set of sensors on the seat cushion 12 are referred to as a cushion sensor group 102.

In the present embodiment, the cushion sensor group 102 includes two pairs of left and right sensors arranged in the front-rear direction. Hereinafter, as shown in FIG. 2, the sensors located in the rear right, rear left, front right, and front left portions are referred to as a sensor 102*a*, a sensor 102*b*, a sensor 102*c*, and a 102*d*, respectively. The respective touch areas of the rear right, rear left, front right, and front left sensors 102*a*, 102*b*, 102*c*, and 102*d* are located in the rear right, rear left, front right, and front left portions of the front surface of the seat cushion 12, respectively.

Although, in the present embodiment, sensors are provided only on or in the seat body 5A, embodiments of the present invention are not limited to this configuration. In some cases, sensors may be provided on or in the door trims 17 and 18 and the instrument panel 20, which are structures located around the seat body 5. In this case, the touch areas of the sensors of the door trims 17 and 18 are located on the interior side surfaces of the door trims 17 and 18, respectively.

Furthermore, although, in the latter embodiment, sensors are provided on or in the seat body 5, the door trims 17, 18 and the instrument panel 20, embodiments of the present invention are not limited to this configuration. Sensor may be provided on or in any structure around the seat body 5.

For sensors provided on or in the instrument panel 20, the touch areas 58S of the sensor is preferably located on the interior surface of the panel. Moreover, sensors may also be provided on or in a roof 40 (ceiling). In this case, the touch area of the sensor is preferably located on the interior surface of the roof 40. In addition, sensors may also be provided on or in pillars 60 forming window columns. In this case, the touch area 61S of each of the sensors is preferably located on the interior surface of a corresponding window pillar.

In some cases, sensors may also be provided on or in a steering wheel 42 or a table 43 attached to the seat back 11. In this case, each of the touch areas 58S, 59S, and 61S is preferably located at a position where a user can touch when the user is seated on a corresponding one of the seat bodies 5.

Figure 4:
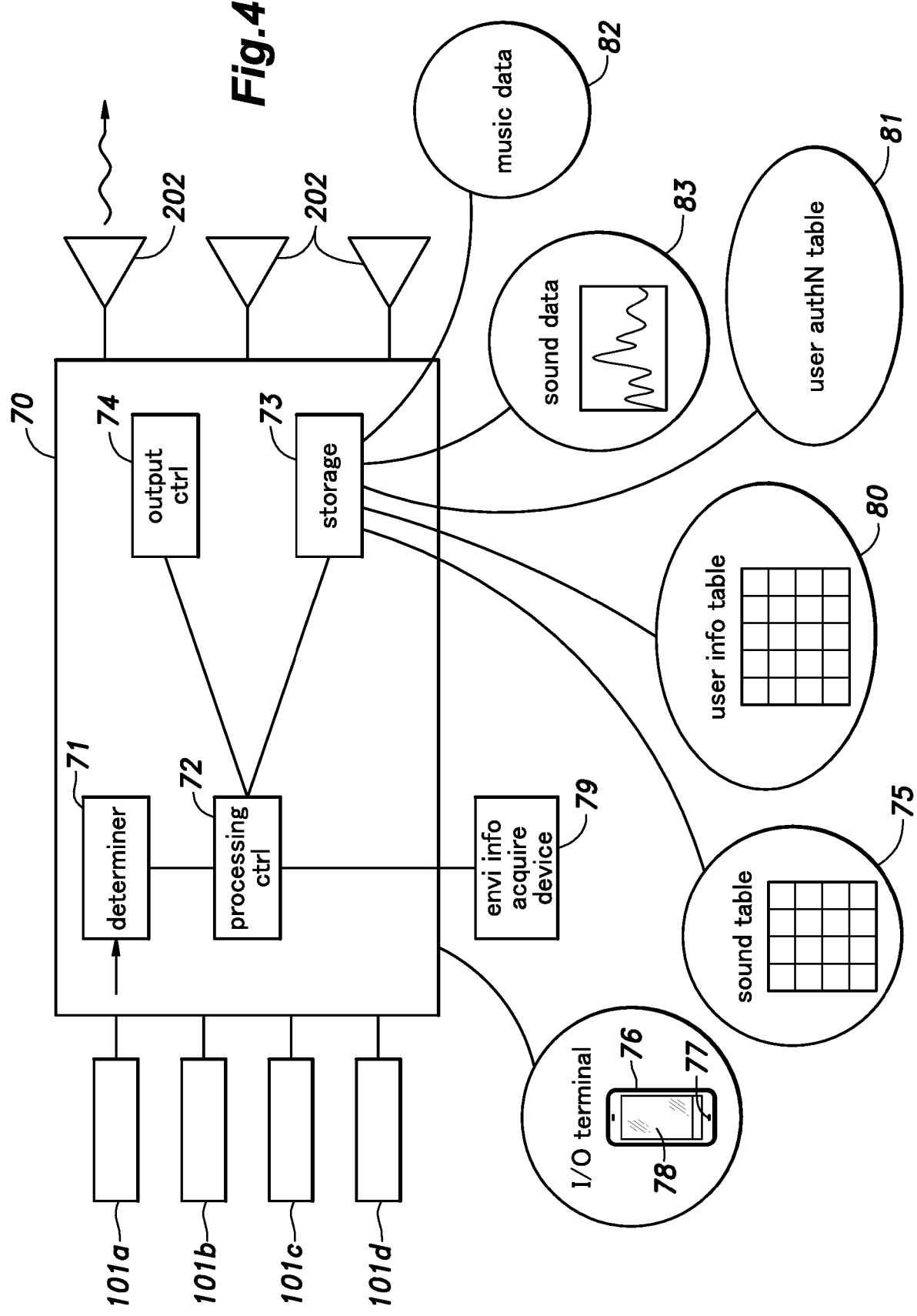
FIG. 4 is a diagram illustrating a sound output operation performed by the seat system of the present invention.

Sensors included in the seat system are given the respective IDs so that the sensors are distinguishable from one another. As shown in FIG. 4, each ID may be set to enable a user to easily recognize which component member a corresponding sensor is located on or in.

The output device includes speakers 202A provided in the door trims 17 of the left and right front doors 15. However, embodiments of the present invention are not limited to this configuration. In some cases, the output device may include speakers 202B provided in the door trims 18 of the left and right rear doors 16. Furthermore, the output device may include speakers 202C provided on the left and right rear side trims 19. The speakers 202A (202B, 202C) are coupled to the vehicle exterior side surfaces of the corresponding door trims 17 (18, 19), respectively, and are connected to the control device 70 via predetermined signal lines. The speakers 202A (202B, 202C) are devices for outputting sound toward the interior of the passenger compartment 2, and are controlled by the control device 70.

Although the present embodiment, the output device includes speakers 202, embodiments of the present invention are not limited to this configuration. In some cases, the output device includes at least one device for outputting at least one of sound, light, and vibration based on signals provided from the control device 70.

Specifically, the output device is provided on the roof 40 (ceiling) defining the upper surface of the passenger compartment 2, and may include a plurality of interior lights 41 for illuminating the interior of the passenger compartment 2 based on signals from the control device 70. In this case, each interior light 41 is preferably located upward and frontward of a corresponding seat body 5. More specifically, the output device may be any one of interior lights 41A, 41B, and 41C located upward and frontward of the front seat body 5A, the mid-seat body 5B, and the rear seat body 5C, respectively.

The output device may also include a vibration device 45 provided in the seat body 5 for transmitting vibration to a seated user. The vibration device 45 may be provided in or on either the seat cushion 12 or the seat back 11, and may be a known device configured to, based on signals from the control device 70, transmit vibration to a person seated on a corresponding seat body 5.

The control device 70 is an electronic control unit (ECU) configured by a microcomputer, and includes a ROM, a RAM, a peripheral circuit, an input/output interface, and other units.

The control device 70 is communicably connected to each sensor and the output device. Upon receiving a signal indicating the detection of a pressing operation from a sensor, the control device 70 controls the output device in response to the received signal so as to generate a corresponding output (sound in the present embodiment). To perform such control operations, the control device 70 includes a determiner 71, a processing controller 72, a storage 73, and an output controller 74 as functional units. The determiner 71, the processing controller 72, and the output controller 74 are each implemented by a corresponding computer program executed by the control device 70. The processing operations performed by the control device 70 will be described below with reference to FIGS. 4 and 5.

Upon receiving a signal indicating the detection of a touch operation, the determiner 71 determines which sensor has detected the touch operation and provides the ID of the sensor to the processing controller 72.

The storage 73 stores a sound table 75 (FIG. 5) indicating a sensor ID, a musical instrument name, and a note of a musical scale for each of the sensors. In other words, the sound table 75 indicates a set of data records for each sensor, the data records consisting of the corresponding ID, a corresponding musical instrument name, and a corresponding note. The term "note" refers to a sound pitch of a sound scale, such as C, D, or E.

As shown in FIG. 5, in the present embodiment, each of the musical instruments is assigned for a corresponding component member with sensors, so that one musical instrument is assigned for a sensor. For example, the musical instrument "piano" is assigned for the sensors on or in the seat back 11; that is, the sensors 101*a* to 101*d*, which belong to the back sensor group 101, and the musical instrument "violin" is assigned for the sensors on or in the seat cushion 12; that is, the sensors 102*a* to 102*d*, which belong to the cushion sensor group 102.

In this way, since one musical instrument is assigned for a component member with sensors, the sensors provided on or in a component member form a sensor group for which the same musical instrument is assigned. Musical instruments assigned for the respective sensor groups may be different from each other. For each sensor group, different notes of a musical scale may be assigned for the respective sensors. For example, for the back sensor group 101, a C note sound, a D note sound, an E note sound, and an F note sound of a piano are assigned for the sensor 101*a*, the sensor 101*b*, the sensor 101*c* and the sensor 101*d*, respectively.

Similarly, for the cushion sensor group 102, a C note sound, a D note sound, an E note sound, and an F note sound of a violin are assigned for the sensor 102*a*, the sensor 102*b*, the sensor 102*c* and the sensor 102*d*, respectively.

The storage 73 further stores sound data 83 of the respective notes of each musical instrument included in the sound table 75.

Upon acquiring the ID of a sensor determined by the determiner 71, the processing controller 72 refers to the sound table 75 stored in the storage 73 to acquire the note and the musical instrument assigned for the ID of the sensor. Subsequently, the processing controller 72 acquires sound data 83 for the musical instrument and the note from the storage 73, and provides a signal for the acquired sound data 83 to the output controller 74.

The output controller 74 converts the received signal of sound data 83 to a converted signal and outputs a corresponding sound from the speaker 202.

Next, the operations and effect of the so-configured seat system 1 will be described.

As shown in FIG. 4, when a user moves to press the sensor 101*a* on or in the seat back 11, the sensor provides a signal to the determiner 71. The determiner determines that the received signal is from the sensor 101*a*, and provides the ID of the sensor 101*a* to the processing controller 72.

Based on the received ID, the processing controller 72 refers to the sound table 75 stored in the storage 73, and acquires a C note sound of a piano corresponding to the ID. Then, the processing controller 72 provides the sound data 83 of the C note sound of piano acquired from the storage 73 to the output controller 74.

The output controller 74 receives the sound data 83 from the processing controller 72, converts the sound data 83 to a converted sound signal, and provides the sound signal to the speaker 202. As a result, the speaker outputs the C note sound of piano.

When a user moves to press the sensor 101*b* on or in the seat back 11, the speaker 202 outputs a D note sound of piano. In this way, since each sensor has a corresponding set of instrument and note assigned therefor, a user can enjoy moving the body so as to output different sounds, which encourages the user to move the body.

When a user touches the sensor 102*a* on or in the seat cushion 12, which is another component member, the speaker outputs a high C note sound of violin. Thus, the seat system enables a user to produce various musical instrument sounds according to the user's touch operations.

In the above-described embodiments, the sensors are provided only on or in the seat body 5. However, even when sensors are provided on or in one or more structural members around the seat body 5, the sensors are preferably arranged so as to form a sensor group for each structural member. In this case, each musical instrument is assigned for a corresponding member provided with sensors, so that the sensors on or in the member form a group (i.e., sensor group) for which the same instrument sound is produced. Sensors provided on or in structural members around the seat body 5 are given the respective IDs so that each sensor is distinguishable from the other sensors. Each ID is preferably determined to enable a user to easily recognize which component member a corresponding sensor is located on or in.

In the present embodiment, when the output device includes a plurality of interior lights 41, the control device 70 may use, for example, a seat sensor provided on or in the seat body 5 to acquire the position of the seat on which a user is seated, and selectively turn on/off the interior light 41 located upward and frontward of the user's seat.

The interior light 41 may be capable of selectively emitting light in any of a plurality of colors, and may include a multicolor LED element, for example. In this case, the control device 70 may control the interior light 41 to emit light in response to the sensor's detection of a touch operation such that, for each sensor, the interior light 41 emits light in a corresponding one of different colors. In some cases, the control device 70 may control the interior light 41 to emit light in response to the sensor's detection of a touch operation such that, for each member with sensors, the interior light 41 emits light in a corresponding one of the different colors. In other words, sensor groups are formed such that, for any sensor of each sensor group, the interior light 41 emits light in the same color.

In the present embodiment, when the output device includes the vibration device 45, the control device 70 may use, for example, seat sensors on or in the seat body 5 to acquire the position of the seat on which a user is seated, and cause the vibration device 45 in the user's seat to vibrate. The vibration device 45 may be capable of producing vibration with a constant frequency and a predetermined amplitude. In other cases, the control device 70 may control the vibration device 45 to produce vibration in response to the sensor's detection of a touch operation such that, for each sensor, the vibration device 45 outputs vibration with a corresponding combination of frequency and amplitude. In some cases, the control device 70 may control the vibration device 45 to output vibration in response to the sensor's detection of a touch operation such that, for each member with sensors, the vibration device 45 produces vibration with a corresponding combination of frequency and an amplitude In other words, sensor groups are formed such that, for sensors of each sensor group, the vibration device 45 outputs vibration with the same frequency and amplitude.

Second Embodiment

A seat system 300 according to a second embodiment of the present invention is different from the seat system 1 of the first embodiment in that the seat system 300 further includes a biosensor, an input/output terminal 76 communicably connected to the control device 70, and an environment information acquisition device 79 capable of communicating with the control device 70 and with the outside. Moreover, in the second embodiment, the storage 73 further stores a user authentication table 81 containing name data and biometric data of each user, a user information table 80 containing user data of each user, and music data 82 of music titles included in the user information table 80. Moreover, the second embodiment is different from the first embodiment in that the control device 70 executes a game application(s) that utilizes the seat system.

The biosensor acquires biometric information used to identify a user. More specifically, the biosensor acquires biometric information associated with at least one of person's fingerprint, iris retina, and face of each user that can be used to identify the user. In the present embodiment, the biosensor is a fingerprint sensor 77 mounted in the input/output terminal 76 as shown in FIG. 4.

The input/output terminal 76 is provided with a touch panel, and configured to receive a user's input, and output the user's input to the control device 70. The touch panel functions as a display device 78 for displaying information and also functions as an interface for receiving a user's touch operation as an input. The input/output terminal 76 may be a tablet, a car navigation system, or any other suitable device. In the present embodiment, the input/output terminal 76 is a smartphone as shown in FIG. 4.

The environment information acquisition device 79 acquires information on the seat body 5 or a surrounding environment thereof. When the seat body 5 is provided indoors, the information is related to an outdoor air temperature and the weather. In the present embodiment, the seat body 5 is mounted in the vehicle M. The environment information acquisition device 79 acquires information on at least one of a vehicle speed, an obstacle the vehicle M is approaching, a traffic state around the vehicle M, and weather around the vehicle M. Specifically, the environment information acquisition device 79 receives signals from artificial satellites via a GPS receiver to thereby acquire the position data of the vehicle M provided with the seat system 300. Then, the environment information acquisition device 79 communicates with the outside via a network based on the acquired position data to thereby acquire information on the weather and traffic around the vehicle M and other information, and transmit the acquired information to the processing controller 72.

Figure 6:
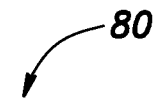
FIG. 6 shows a table indicating user information according to a second embodiment of the present invention.

As shown in FIG. 6, the user information table 80 contains, for each user, a user name, a user's favorite music genre, a music title, a music tempo, and a musical instrument. In the present embodiment, as shown in FIG. 6, the user information table 80 contains information on a music tempo as a tempo (such as fast, slow, or standard) selected by the user for the music or song indicated in the music title. The user authentication table 81, which is stored in the storage 73, contains, for each user, biometric information acquired by the biometric information sensor and the user name.

Figure 7:
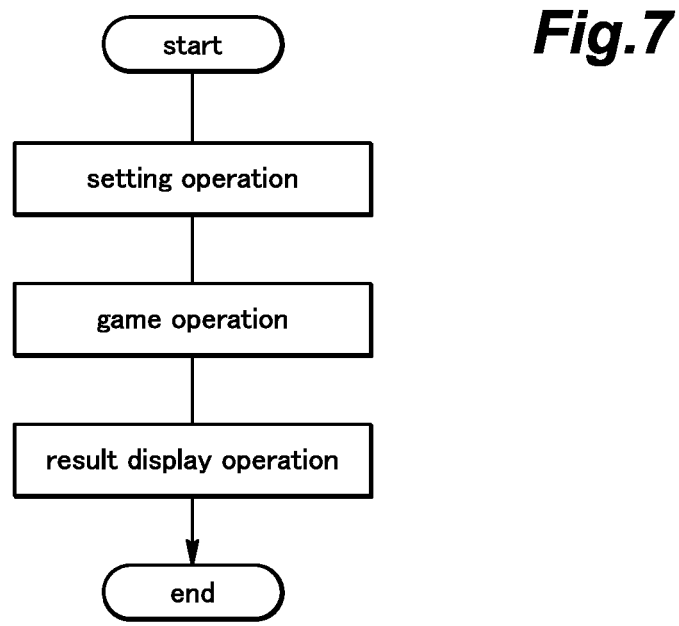
FIG. 7 is a diagram illustrating a game application execution operation performed by a control device according to the second embodiment.

Upon receiving a predetermined input from the input/output terminal 76, the control device 70 runs a game application, which instructs a user to move the body to the music so as to provide inputs to touch sensors. By executing the game application, the control device 70 performs an application execution operation based on a flowchart as shown in FIG. 7. The operation will be described below with reference to FIG. 7.

As shown in FIG. 7, in the first step of the application execution operation, the control device 70 performs a setting operation. In the setting operation, the control device 7 acquires user information from the input/output terminal 76 and the biosensor, and sets various conditions required for executing the game. The various conditions include a music title, a music tempo, and a musical instrument.

Upon completion of the setting operation, the control device 70 performs a game operation. When the control device 70 starts the game operation, the input/output terminal 76 receives an input as to whether or not to start the game. Upon receiving an input to start the game, the control device 70 outputs music from a speaker based on a music title and a music tempo set in the setting operation, and starts the game. In the operation, the control device 70 acquires the timing at which a user performs a touch operation, and according to the method of the first embodiment, the control device 70 outputs an output sound of a musical instrument from the speaker 202, the musical instrument being set in the setting operation and included in the user information table 80.

During the game operation, the control device 70 may change the tempo of the music output from the speaker 202 based on the information acquired from the environment information acquisition device 79. For example, when the outside air temperature around the vehicle M is equal to or higher than a predetermined threshold value, the control device 70 slows down the tempo of music, and when the outside air temperature is lower than the predetermined threshold value, speeds up the tempo of music. As a result, the amount of movement to be made by the user is adjusted according to the outside air temperature. The control device 70 may acquire the vehicle speed from the environment information acquisition device 79 and change the music tempo according to the vehicle speed.

During the game operation, the control device 70 may change the volume of the music output from the speaker 202 based on the information acquired from the environment information acquisition device 79. For example, when detecting that the vehicle is approaching an obstacle, the control device 70 may stop the sound output from the speaker or lower the volume of the sound output to a predetermined level or lower. As a result, the user can recognize that the vehicle M is approaching an obstacle through the change in the sound.

In other cases, the control device 70 may acquire time information, and when the time of day is nighttime or early morning, the control device reduces the volume of sound from the speaker 202 to a level that would not make a passenger uncomfortable. In other embodiments, the control device 70 may acquire the vehicle speed from the environment information acquisition device 79, and be configured such that, when the vehicle speed is equal to or higher than a predetermined level, the control device increases the volume of sound from the speaker 202 to be louder than the volume used when the vehicle speed is lower than the predetermined value. This configuration can prevent a user from facing difficulty in hearing the music because of the noise occurring when the vehicle is travelling.

When the music is finished, the control device 70 performs a result display operation. In the result display operation, the control device 70 calculates the degree of synchronization between the timings of music and the times at which the user performed touch operations detected by the sensors during the game operation. Then, the control device 70 displays the degree of synchronization on the display device 78 of the input/output terminal 76.

Next, the setting operation performed by the control device 70 will be described with reference to FIGS. 4, 7 and 8.

Figure 8:
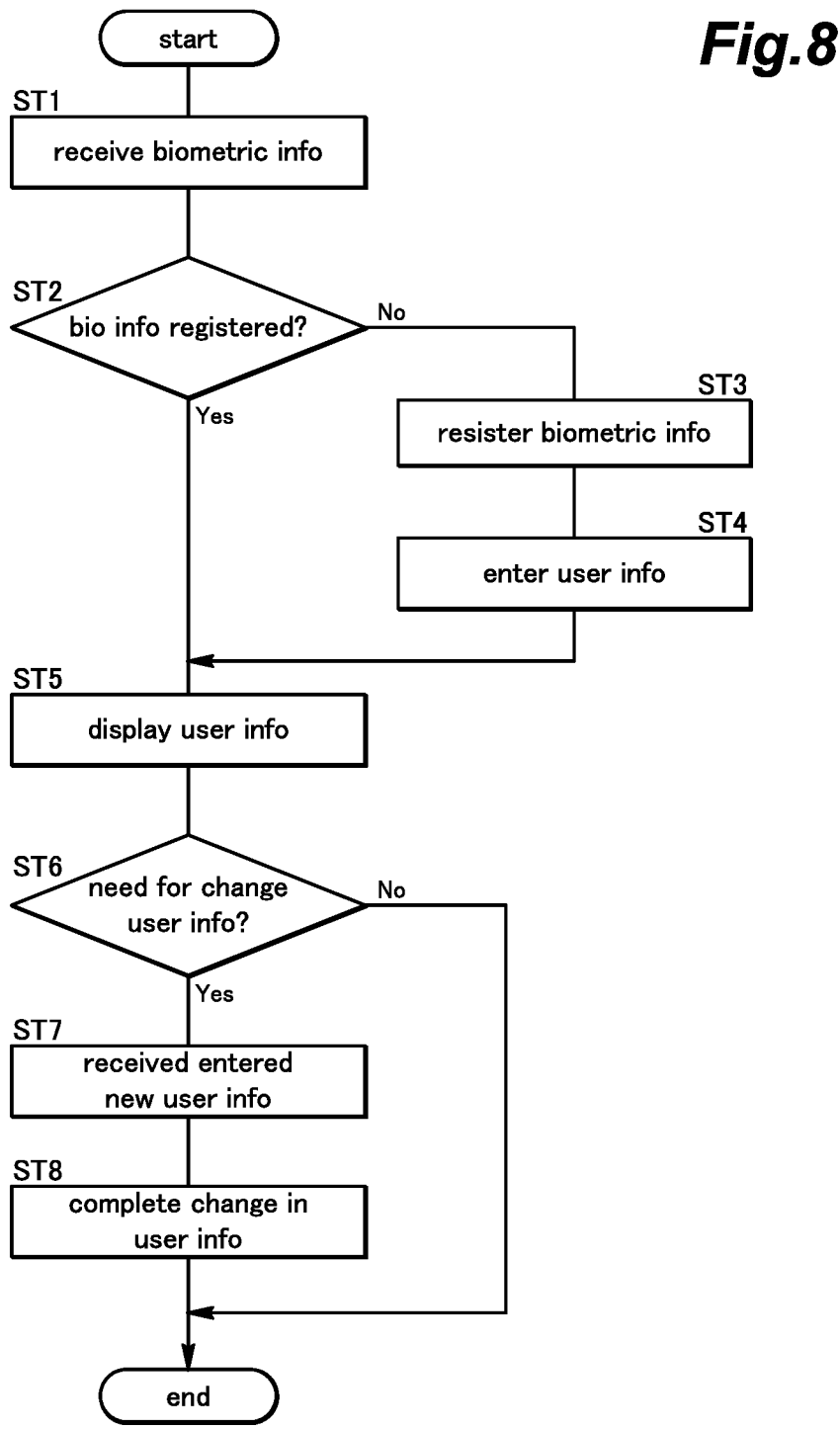
FIG. 8 is a diagram illustrating a setting operation performed by the control device according to the second embodiment.

As shown in FIG. 8, in step ST1, the processing controller 72 displays a screen for encouraging a user to touch a fingerprint sensor 77 on the display device 78 of the input/output terminal 76, and receives the user's input from the fingerprint sensor 77. When the user's input is completed, the process proceeds to step ST2.

In step ST2, the processing controller 72 determines whether or not the user authentication table 81 in the storage 73 includes a user name corresponding to the received biometric information, and when determining that the table contains the user name, the process proceeds to step ST5, and when the table does not contain the user name, the process proceeds to step ST3.

In step ST3, the processing controller 72 adds biometric information acquired in step ST1 to the user information table 80 stored in the storage 73. When the addition of information is completed, the process proceeds to step ST4.

In step ST4, the processing controller 72 displays entry fields for a user's favorite music genre and music title, and an entry completion button on the display device 78 of the input/output terminal 76, so that the user can register the additional user information other than the user's biometric information. The processing controller 72 also displays a selection field on the display device 78 of the input/output terminal 76 for enabling a user to change the tempo faster or slower than the original tempo for each song. In addition, the processing controller 72 may select a musical instrument that is suitable for the user's selected music genre, and display it on the display device 78 of the input/output terminal 76. Furthermore, the processing controller 72 may display an entry field for enabling a user to make a change of musical instruments on the display device 78 of the input/output terminal 76. Upon detection of the operation on the entry completion button, the process proceeds to step ST5.

In step ST5, the processing controller 72 refers to the user information table 80 and acquires the music genre, music title, music tempo, and musical instrument for the user name. Then, the processing controller 72 displays the acquired user's information on the display device 78 of the input/output terminal 76, and then the process proceeds to step ST6.

In step ST6, the processing controller 72 receives, through the display device 78, a user's selection as to whether or not a user wishes to change any of the music genre, music title, music tempo, and musical instrument displayed on the display device 78 of the input/output terminal 76. When receiving the user's selection indicating the need to change some items of the user information, the process proceeds to step ST7, and when receiving the user's selection indicating no need for changes, the control device 70 ends the setting operation.

In ST7, the processing controller 72 displays the items of the user's favorite music genre, music title, music tempo, and musical instrument on the display device 78 of the input/output terminal 76 in such a manner that a user can make a change to each item. After receiving changes to one or more items of the information entered by the user through the display device 78, the process proceeds to step ST8.

In step ST8, the processing controller 72 displays a change entry completion button on the display device 78 of the input/output terminal 76, and receives a confirmation indicating that the user has entered all the necessary changes to the items of the user information. Upon detecting a user's operation on the change entry completion button, the control device 70 ends the setting operation.

After the completion of the setting operation, the processing controller 72 outputs music data 82 of a user's preferred music title in the user information table 80 to the output controller 74. The output controller 74 outputs the received music data 82 from the speaker 202, and the control device 70 performs the game operation.

Next, operations, particularly, those in the setting operation, performed by the seat system 300 of the second embodiment will be described.

When starting the setting operation, the seat system displays a screen on the display device 78 of the input/output terminal 76, the screen instructing a user to touch the fingerprint sensor 77 with a finger of the user. Then, when the user brings the user's finger into contact with the biosensor, the seat system provides the detected biometric information to the processing controller 72 (ST1). The processing controller 72 refers to the user authentication table 81 and acquires the user name for the received biometric information. Then, the processing controller 72 determines whether or not the acquired user name is registered in the user information table 80 (ST2). When determining that the user name has been registered, the processing controller 72 displays user information on the display device 78 of the input/output terminal 76 (ST5), and receives the user's selection as to whether or not the user needs to change any of the items (ST6). Then, the user confirms the user information displayed on the display device 78 of the input/output terminal 76, and enters the user's selection as to the need for changes.

When determining that the user name has not been registered in the user information table 80, the processing controller 72 displays a user information entry screen on the display device 78 of the input/output terminal 76, and adds the entered user information and user's biometric information to the user information table 80 and the user authentication table 81 (ST3, ST4).

When the user enters a selection indicating the need to change some items of the user information displayed on the display device 78 of the input/output terminal 76, then the user enters changes to one or more items of the user information (ST7) on the display device 78. After the completion of entry of the changes, the user operates on the change entry completion button displayed on the display device 78 of the input/output terminal 76 (ST8). In this way, the setting of the music title, music tempo, and musical instrument used to output sound for the user is completed, and the setting operation ends.

Next, the effect achieved by the seat system 300 according to the second embodiment will be described. In the setting operation for a game application to be run by the control device 70, after entering biometric information, a user can use the user information associated with the entered biometric information. The user information, which is preregistered in the control device 70, is associated with music output from the speaker during the game operation. A user can make changes to the user information as appropriate through the user's entry operation. This configuration enables a user to play the game, moving the body to the user's favorite music, without entering the user information each time.

During the game operation, the control device 70 outputs music from the speaker 202 and instructs a user to move the body to the music so as to provide inputs to touch sensors. This configuration can encourage the user to move the body. Furthermore, during the game operation, the control device 70 acquires information on a surrounding environment of the seat system 300 from the environment information acquisition device 79. The control device 70 changes the tempo and volume of the music output from the speaker 202 according to the acquired surrounding environment information. This configuration enables a user to enjoy playing the game using the seat system in a more comfortable environment.

Third Embodiment

A seat system A according to a third embodiment of the present invention is different from the seat systems 1, 300 according to the first and second embodiments, in that the seat system A and another seat system B are communicably linked to each other through respective input/output terminals 76 such that and the seat systems A and B can share the outputs of the respective output devices. Since the remaining parts of the third embodiment are the same as the first and second embodiments, the description of such parts is not repeated. It should be noted that an input/output terminal 76A of the seat system A of the third embodiment needs to be communicably connected not only to the control device 70 of the seat system A, but also to an input/output terminal 76B of the seat system B.

Figure 9:
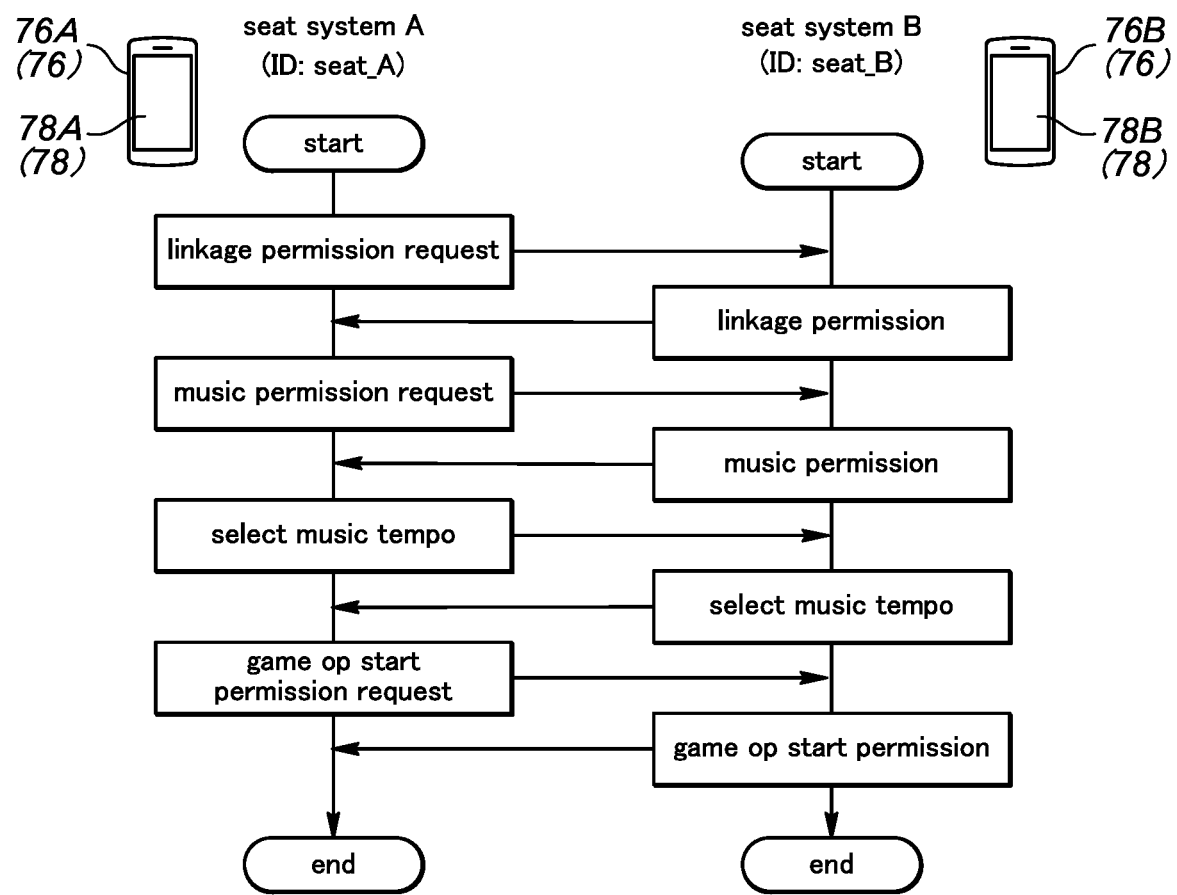
FIG. 9 is a diagram illustrating how two seat systems are linked to each other according to a third embodiment of the present invention.

Next, operations required to link the seat system A to another seat system B so that both of the seat systems can share the outputs of the respective output devices during execution of the game application will be described with reference to FIG. 9.

After the completion of the setting operation required for executing the game application, the processing controller 72 displays the entry field for an ID of another seat system on the display device 78A of the input/output terminal 76A together with the start button. When the ID (seat_B) of a seat system B is entered to the entry field, the input/output terminal 76A starts operations required for linkage between the seat systems as shown in FIG. 9. First, the input/output terminal 76A of the seat system A transmits a linkage permission request to the input/output terminal 76B of the seat system B with the entered ID. Upon receiving the request, the input/output terminal 76B of the seat system B notifies a user of the seat system B of the receipt of the linkage permission request from the different seat system A. The seat system B may provide the notification to its user by displaying a visual notification on the display device 78 of the input/output terminal 76 or by outputting a sound from the speaker 202 of the input/output terminal 76.

When the user enters a linkage permission (an input indicating the user's linkage permission) to the input/output terminal 76B of the seat system B, the input/output terminal 76B transmits a linkage permission notice to the input/output terminal 76A of the seat system A. Upon receiving the linkage permission notice, the input/output terminal 76A of the seat system A notifies its user of the receipt of the linkage permission notice from the seat system B.

When the user enters a linkage refusal (an input indicating the user's linkage refusal) to the input/output terminal 76B of the seat system B, the input/output terminal 76B transmits a linkage refusal notice to the input/output terminal 76A of the seat system A. Upon receiving the linkage refusal notice, the input/output terminal 76A of the seat system A may notify its user of the receipt of the linkage refusal notice from the different seat system B.

After notifying the user of the reception of the linkage permission notice, the input/output terminal 76A of the seat system A refers to the music title in the user information table 80 for the user of the seat system A. The input/output terminal 76A of the seat system A transmits a request for permission of outputting music of the music title during the game operation (music permission request), to the input/output terminal 76B of the seat system B. Upon receiving the request, the input/output terminal 76B of the seat system B notifies its user of the reception of the request for permission of outputting the music from the seat system A. When the user enters a music permission (an input indicating the user's permission regarding the music) to the input/output terminal 76B of the seat system B, the input/output terminal 76B transmits a permission notice for the music (music permission notice) to the input/output terminal 76A of the seat system A.

Upon receiving the permission notice for the music (music permission notice), the input/output terminal 76A of the seat system A notifies its user of the reception of the music permission notice from the different seat system B.

When the input/output terminal 76B of the seat system B transmits a music refusal notice for the selected music to the input/output terminal 76A of the seat system A, the input/output terminal 76A of the seat system A notifies its user of the receipt of the music refusal notice from the seat system B. In this case, the input/output terminal 76A of the seat system A may instruct the user through the display device 78A to select a music title different from the previously selected music title. In this case, the input/output terminal 76A of the seat system A may refer to the user information table 80 stored in the storage 73 and display all the music titles included in the user information table 80 on the display device 78A.

After notifying the user of reception of the permission notice for the music (music permission notice), the input/output terminal 76A of the seat system A receives a music tempo selection entered by the user through the display device 78A, the music tempo selection indicating the tempo of music to be output. The input/output terminal 76A of the seat system A transmits the user's music tempo selection to the input/output terminal 76B of the seat system B. Upon receiving the music tempo selection, the input/output terminal 76B of the seat system B notifies the user that the music tempo selection has been entered at the input/output terminal 76A of the seat system A. Then, the input/output terminal 76B of the seat system B receives a music tempo selection entered by the user through the display device 78B, the music tempo selection indicating the tempo of music to be output. The input/output terminal 76B of the seat system B transmits the user's music tempo selection to the input/output terminal 76A of the seat system A. Upon receiving the music tempo selection, the input/output terminal 76A of the seat system A notifies the user that the music tempo selection has been entered at the input/output terminal 76B of the seat system B.

Then, the input/output terminal 76A of the seat system A transmits a game operation start permission request (i.e. a request for the start of the game operation) to the input/output terminal 76B of the seat system B. Upon receiving the request, the input/output terminal 76B of the seat system B notifies its user of the receipt of the game operation start permission request from the seat system A. Then, the input/output terminal 76B of the seat system B receives a game operation start permission entered through the display device 78B by its user. When the user enters the game operation start permission, the input/output terminal 76B of the seat system B transmits a game operation start permission notice to the input/output terminal 76A of the seat system A. When the seat system A receives the notice, the seat system A and the seat system B start the game operation.

Next, operations performed by the seat system A and the seat system B will be described.

Before music is started in the setting operation required for executing the game application, the user of the seat system A enters the ID (seat_B) of the seat system B to which the user wants to make a linkage from the seat systems A.

A user of the seat system B recognizes that the linkage permission request has been received from the seat system A through the notification provided by the input/output terminal 76B. Then, the user of the seat system B enters a linkage permission or a linkage refusal to the input/output terminal 76B.

When the user of the seat system B enters a linkage permission, the input/output terminal 76A of the seat system A notifies its user that the linkage permission has been entered by the user of the seat system B. Then, the user of the seat system B is notified that the seat system B has received a music permission request for a selected music title transmitted from the seat system A through the input/output terminal 76A. Then, the user of the seat system B enters a music permission or refusal for the selected music title to the input/output terminal 76B.

When the user of the seat system B enters a linkage refusal, the input/output terminal 76A of the seat system A notifies its user that the linkage refusal has been entered by the user of the seat system B. As a result, the user of the seat system A recognizes that no linkage will be made between the seat system A and the seat system B.

When the user of the seat system B enters the music permission for the selected music, the seat system A notifies its user that the music permission for the selected music has been entered by the user of the seat system B through the input/output terminal 76A. Then, the user of the seat system A selects the tempo of the music to be output and enters the selected music tempo to the input/output terminal 76A (tempo selection). Next, the input/output terminal 76B of the seat system B notifies its user that the user of the seat system A has entered the music tempo. In response, the user of the seat system B also enters the tempo of the selected music to the input/output terminal 76B (tempo selection).

When the user of the seat system B enters a music refusal for the selected music, the input/output terminal 76A of the seat system A notifies its user that the refusal of outputting the selected music has been entered. Then, the user of the seat system A selects another music title from the list of music titles displayed on the display device 78A of the input/output terminal 76A, and enters a newly selected music title to the input/output terminal 76A.

When the user of the seat system B selects a music tempo and enters it to the input/output terminal 76B, the input/output terminal 76A of the seat system A notifies its user that the music tempo has been entered by the user of the seat system B. Next, the user of the seat system A enters the game operation start request to the input/output terminal 76A. Then, the input/output terminal 76B of the seat system B notifies its user that the game operation start permission request has been entered. In response, the user of the seat system B enters a game operation start permission to the input/output terminal 76B.

When the user of the seat system B enters the game operation start permission, the users of the seat systems A and B start the game application at the same time.

When the game operation is completed, the control device 70 of each of the seat systems A and B perform a result display operation. In the result display operation of the present embodiment, the control device 70 of each seat system displays both of the game results of the seat systems A and B, which are linked to each other, on the display device 78 of a corresponding input/output terminal 76. Preferably, the control device 70 displays game results after the completion of the game operations performed by all the linked seat systems. As a result, both of the users of the seat systems A and B who have played the game using the same music can confirm their game results.

Although, in the above-described embodiments, seat systems which are linked to each other include only the seat system A and the seat system B, embodiments of the present invention are not limited to this configuration. For example, seat systems which are linked to one another may include three or more seat systems.

Specific embodiments of the present invention are described herein for illustrative purposes. However, the present invention is not limited to those specific embodiments, and various changes may be made for elements of the embodiments without departing from the scope of the present invention. For example, in the first embodiment, the output from the output device in response to a touch operation on the sensors may include any combination of sound, light, and vibration outputs. This configuration can increase the number of different outputs from the output device.

In some cases, when detecting an abnormality in a sensor, the control device 70 may limit the output of the output device. This configuration can prevent sensors from malfunctioning.

When the output device includes one or more speakers, the speakers may have a noise canceling function for canceling ambient noise. Although, in the above-described embodiments, the speakers are provided in the door trims 17 of the left and right front doors 15 and the left and right rear side trims 19, the present invention is not limited to this configuration. For example, a speaker may be located on or in each component member provided with sensors of one sensor group, so that the speaker on the member can output a sound in response to a touch operation on the sensors of the sensor group. In this configuration, since sensors of a sensor group and a speaker that outputs sound in response to touch operations on the sensors may be arranged in or on the same component member, the seat system can more effectively make its user feel as if the user is directly operating a device for producing sound.

In the second embodiment, the seat system 300, which is communicably connected to the control device 70, may be configured to include a thermometer and a pulse meter for measuring the user's body temperature and pulse rate. In this case, the control device 70 may acquire information on the body temperature and pulse rate of the user to change the sound output from the speakers accordingly. For example, when the user's body temperature or pulse rate is equal to or greater than a threshold value, the seat system may output sound or music with a smaller volume. As a result, the seat system can output sound or music from the speakers according to the physical condition of its user.

In the third embodiment, when the user of the seat system A touches the sensor during the game operation and the speaker of the seat system A outputs a sound in response, the speaker of the seat system B may virtually simultaneously output the same sound.

Furthermore, the third embodiment may be modified such that the control device 70 can change a response time, i.e., a time period from a touch operation to production of a sound. In this configuration, when a plurality of seat systems in one vehicle have the respective control devices 70 with different response times, each of the users of the respective seat systems can recognize the sound produced in response to the users' touch operation based on the difference in the response time.

In the setting operation, in the case where a plurality of seat systems are provided in one vehicle, the seat systems may cooperate together to generate a sound from the speakers at the same time, and then instruct the respective users at the same time to perform touch operation, whereby the respective control devices 70 acquires their response times. Then, the control devices 70 communicate with each other to acquire differences in the response time. As a result, in the result display operation, each control device 70 can correct the time of a touch operation so as to compensate for the difference in response time for the control device, and then calculate the degree of synchronization between the timings of music and the times at which touch operations are performed. This configuration enables the assessment of the user's movement by considering user's age, gender, and physical characteristics.

Moreover, in the setting operation, in the case where a plurality of seat systems are provided in one vehicle, the seat systems may independently generate sounds from the speakers, and instruct the respective users to perform touch operations, whereby the control devices 70 acquire respective loads (pressing loads) applied to the sensors during the touch operations. Then, each control device 70 may change a predetermined threshold value of pressing load required for sensors to detect a pressing load. As a result, the seat system can perform the game operation with the use of the changed threshold value of the sensitivity of sensors. This configuration enables a user to enjoy playing the game with the sensitivity of sensors suitable for the user's age, gender, and physical characteristics.

In other cases, in the setting operation, the seat system may output sound from the speakers and instruct a user to perform touch operations on sensors located on or in different members, whereby the control device 740 can acquire loads (pressing loads) applied to the respective sensors during the touch operations. Then, the control devices 70 may change a predetermined threshold value of pressing load required for sensors on or in each member to detect a pressing load. As a result, the seat system may perform the game operation with the use of the changed threshold value of the sensitivity of sensors on or in each member. In this configuration, even when sensors are provided on a plurality of component members, the seat system can effectively detect loads applied to the sensors.

GLOSSARY 1 seat system (first embodiment)
5: seat body
5A front seat body
5B mid-seat body (rear seat body)
10 headrest
11 seat back
12 seat cushion
15 front door
16 rear door
21 pad member
22 skin material
23 first pad member
24 second pad member
41 interior light
45 vibration device
70 control device
72 processing controller
73 storage
74 output controller
75 sound table
76 input/output terminal
77 fingerprint sensor
78 display device
79 environment information acquisition device
80 user information table
81 user authentication table
82 music data
83 sound data
101 back sensor group
102 cushion sensor group
202 speaker
300 seat system (second embodiment)

The invention claimed is:

1. A seat system, comprising:
a seat body on which a user can be seated;
a plurality of sensors provided on or in the seat body or a structure arranged around the seat body, each being configured to detect a touch operation by the user seated on the seat body;
an output device configured to output at least one of sound, light, and vibration; and
a control device configured to control the output device such that, when one or more of the sensors detect a touch operation, the control device causes the output device to generate a corresponding predetermined output,
wherein the output device includes a speaker, and wherein the predetermined output is a sound with a predetermined pitch, and
wherein the seat system can output sound from the speaker and instruct a user to perform touch operations on sensors located on or in different members, wherein the control device can acquire pressing loads applied to the respective sensors during the touch operations and, then, the control device changes a predetermined threshold value of pressing load required for sensors on or in each member to detect a pressing load.

2. The seat system according to claim 1, wherein the plurality of sensors is divided into two or more sensor groups, each sensor group being provided on or in a corresponding one of at least two component members of the seat system, and wherein different instrument sounds are assigned to the respective sensor groups.

3. The seat system according to claim 1, wherein the seat body comprises a seat cushion on which the user is seated and a seat back connected to the seat cushion and located behind the user's back, and
wherein at least one of the plurality of sensors is provided on any one of an upper surface of the seat cushion, a front surface of the seat back, a back side surface of a seat back of a front seat body, an armrest, an ottoman, a headrest, a floor defining a floor surface of a passenger compartment, a steering wheel, a door, an instrument panel, a pillar, and a built-in table.

4. The seat system according to claim 1, wherein the seat system is mounted in a vehicle,
wherein the vehicle includes an environment information acquisition device communicably connected to the control device, and
wherein the control device is configured to:
acquire at least one information record of an environment surrounding the vehicle from the environment information acquisition device; and
change the output of the output device based on the acquired information record.

5. The seat system according to claim 1, further comprising:
a biosensor communicably connected to the control device and configured to authenticate the user; and
an input/output terminal communicably connected to the control device and configured to receive input by the user,
wherein the control device is capable of storing user information about the user, and
wherein the control device first identifies a user who uses the seat system based on user's input to the input/output terminal or user's biometric information from the biosensor, in combination with the user information pre-stored in the control device, and then causes the speaker to output a sound based on the user's input to the input/output terminal or the user information about the identified user pre-stored in the control device.

6. The seat system according to claim 1, further comprising:
an input/output terminal communicably connected to the control device and configured to receive input by the user, and
wherein the seat system can be communicably linked to another seat system such that the control devices of both of the seat systems can share the outputs of the respective output devices.

7. The seat system according to claim 1, wherein each part of the seat body or the structure where a corresponding sensor is provided is made locally rigid.

8. The seat system according to claim 1, wherein, when detecting an abnormality in a sensor, the control device can limit the output of the output device.

* * * * *